(12) United States Patent
Nagao

(10) Patent No.: US 10,109,274 B2
(45) Date of Patent: Oct. 23, 2018

(54) GENERATION DEVICE, RECOGNITION DEVICE, GENERATION METHOD, AND COMPUTER PROGRAM PRODUCT

(71) Applicant: KABUSHIKI KAISHA TOSHIBA, Tokyo (JP)

(72) Inventor: Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 39 days.

(21) Appl. No.: 14/953,087

(22) Filed: Nov. 27, 2015

(65) Prior Publication Data

US 2016/0155440 A1    Jun. 2, 2016

(30) Foreign Application Priority Data

Nov. 28, 2014  (JP) ................ 2014-242111

(51) Int. Cl.
| | | |
|---|---|---|
| G10L 15/193 | (2013.01) | |
| G10L 15/14 | (2006.01) | |
| G10L 15/187 | (2013.01) | |

(52) U.S. Cl.
CPC .......... *G10L 15/193* (2013.01); *G10L 15/148* (2013.01); *G10L 15/187* (2013.01)

(58) Field of Classification Search
CPC .... G10L 15/193; G10L 15/187; G10L 15/148
USPC ............................. 704/256.4, 257
See application file for complete search history.

(56) References Cited

U.S. PATENT DOCUMENTS

| | | |
|---|---|---|
| 7,711,561 B2 | 5/2010 | Hogenhout et al. |
| 7,895,040 B2 | 2/2011 | Sakai et al. |
| 8,275,730 B2 | 9/2012 | Nagao |
| 8,311,825 B2 | 11/2012 | Chen |
| 8,744,836 B2 | 6/2014 | Nagao |
| 8,943,006 B2 | 1/2015 | Nagao |
| 8,972,243 B1* | 3/2015 | Strom ................. G10L 15/1815 704/1 |
| 9,740,678 B2* | 8/2017 | Hofer .................... G06F 17/274 |

(Continued)

FOREIGN PATENT DOCUMENTS

| | | |
|---|---|---|
| JP | 2001-255889 A | 9/2001 |
| JP | 2003-186494 A | 7/2003 |

(Continued)

OTHER PUBLICATIONS

Aubert et al, "Optimization of Weighted Finite State Transducer for SPeech Recognition," IEEE Transactions on Computers, vol. 62, Issue 8, Aug. 2013.*

(Continued)

*Primary Examiner* — Daniel C Washburn
*Assistant Examiner* — Oluwadamilola M Ogunbiyi
(74) *Attorney, Agent, or Firm* — Foley & Lardner

(57) ABSTRACT

According to an embodiment, a generation device includes a receiver and a generator. The receiver is configured to receive a first model that converts subwords serving as elements of words into the words. The generator is configured to produce, on the basis of the first model, a first finite state transducer that includes a first path having transitions converting one or more subwords into one or more words and a second path, whose first state is the first state of the first path, having cyclic paths to which the subwords are assigned and a transition to which a class classifying a word is assigned.

16 Claims, 7 Drawing Sheets

(56) References Cited

U.S. PATENT DOCUMENTS

| | | | |
|---|---|---|---|
| 2001/0053974 A1 | 12/2001 | Lucke et al. | |
| 2005/0043948 A1 | 2/2005 | Kashihara et al. | |
| 2005/0096908 A1* | 5/2005 | Bacchiani | G10L 15/197 704/257 |
| 2008/0133239 A1* | 6/2008 | Jeon | G10L 15/187 704/254 |
| 2008/0208566 A1* | 8/2008 | Alonichau | G06F 17/2755 704/9 |
| 2009/0287958 A1* | 11/2009 | Bhatt | G06F 11/3684 714/26 |
| 2010/0082522 A1* | 4/2010 | Nagao | G06N 5/02 706/54 |
| 2010/0161314 A1* | 6/2010 | Karttunen | G06F 17/2775 704/9 |
| 2010/0161639 A1* | 6/2010 | Bobrow | G06F 17/2775 707/759 |
| 2012/0046935 A1* | 2/2012 | Nagao | G06F 17/2775 704/8 |
| 2013/0073564 A1 | 3/2013 | Nagao | |
| 2013/0179158 A1 | 7/2013 | Nakamura et al. | |
| 2015/0058018 A1* | 2/2015 | Georges | G10L 15/08 704/257 |
| 2015/0178285 A1 | 6/2015 | Nagao | |
| 2015/0179166 A1 | 6/2015 | Nagao | |
| 2015/0179177 A1 | 6/2015 | Nagao | |
| 2015/0220074 A1 | 8/2015 | Nagao | |
| 2015/0243285 A1* | 8/2015 | Lane | G10L 15/34 704/256.1 |
| 2016/0078020 A1* | 3/2016 | Sumita | G06F 17/289 704/9 |
| 2016/0086096 A1 | 3/2016 | Nagao et al. | |
| 2016/0092434 A1* | 3/2016 | Bellegarda | G06F 17/279 704/9 |

FOREIGN PATENT DOCUMENTS

| | | |
|---|---|---|
| JP | 4241771 B2 | 3/2009 |
| JP | 2009-104156 A | 5/2009 |
| JP | 4322815 B2 | 9/2009 |
| JP | 2011-198126 A | 10/2011 |
| JP | 4956334 B2 | 6/2012 |
| JP | 4977163 B2 | 7/2012 |
| JP | 5121650 B2 | 1/2013 |
| JP | 2013-065188 A | 4/2013 |
| JP | 5199985 B2 | 5/2013 |
| JP | 2013-164572 A | 8/2013 |
| JP | 2014-106272 A | 6/2014 |
| JP | 2015-121707 A | 7/2015 |
| JP | 2015-121708 A | 7/2015 |
| JP | 2015-121709 A | 7/2015 |
| JP | 2015-143800 A | 8/2015 |
| JP | 2016-061975 A | 4/2016 |

OTHER PUBLICATIONS

Dixon et al., "A Specialized WFST Approach for Class Models and Dynamic Vocabulary," Interspeech 2012, Sep. 2012, pp. 1075-1078.

Iso et al., "Development of Speech Recognition and Natural Language Processing for ONSEI Assist Service," IPSJ SIG Technical Report, vol. 2013-SLP-98, No. 4, Oct. 25, 2013, pp. 1-6 (with English abstract).

Novak et al., "Dynamic Grammars with Lookahead Composition for WFST-based Speech Recognition," INTERSPEECH 2012, 4 pages.

Schalwyk et al., "Speech Recognition with Dynamic Grammars Using Finite-State Transducers," EUROSPEECH 2003—Geneva, pp. 1969-1972.

Hori Takaaki et al., Speech Recognition Using the Weighted Finite-State Transducers, Information Processing, vol. 45, No. 10, Information Processing Society of Japan, Oct. 15, 2004, pp. 1020-1026 with English machine translation.

* cited by examiner

GENERATION DEVICE, RECOGNITION DEVICE, GENERATION METHOD, AND COMPUTER PROGRAM PRODUCT

CROSS-REFERENCE TO RELATED APPLICATION

This application is based upon and claims the benefit of priority from Japanese Patent Application No. 2014-242111, filed on Nov. 28, 2014; the entire contents of which are incorporated herein by reference.

FIELD

An embodiment described herein relates generally to a generation device, a recognition device, a generation method, and a computer program product.

BACKGROUND

Finite state automata are used in various fields such as natural language processing and pattern recognition. For example, a finite state automaton (FSA) is used for searching for a specific character string or a character string pattern appearing in sentences. The finite state automata are called finite automata or finite state machines (FSMs) in some cases.

An FSA that takes into consideration weights besides input symbols used in the FSA is called a weighted finite state acceptor (WFSA). An FSA that takes into consideration output symbols is called a finite state transducer (FST). An FSA that takes into consideration weights and output symbols is called a weighted finite state transducer (WFST). The WFST is used for expressing a dictionary and a model necessary for pattern recognition such as speech recognition, handwriting character recognition, and optical character recognition (OCR), and used for statistical machine translation.

A WFST that converts subwords into words, hereinafter described as L, is used for the pattern recognition that outputs a word or a word string as a recognition result using the WFST. The subwords are elements of the words. When no weights are required, L is sometimes expressed by the FST. For allowing a pattern recognition device to recognize a new word (herein after described as an additional word) not included in L, some techniques have been proposed. In one technique, the additional word is added to L. In another technique, a path relating to the additional word is embedded in a WFST that represents a language model, hereinafter described as G, without adding the additional word to L.

In such conventional techniques, L or G is changed by embedding the path corresponding to the additional word in L or G. This change makes it difficult to share the WFST among a plurality of pattern recognition devices when the pattern recognition devices need to recognize the different additional words from one another.

DETAILED DESCRIPTION

Figure 1:
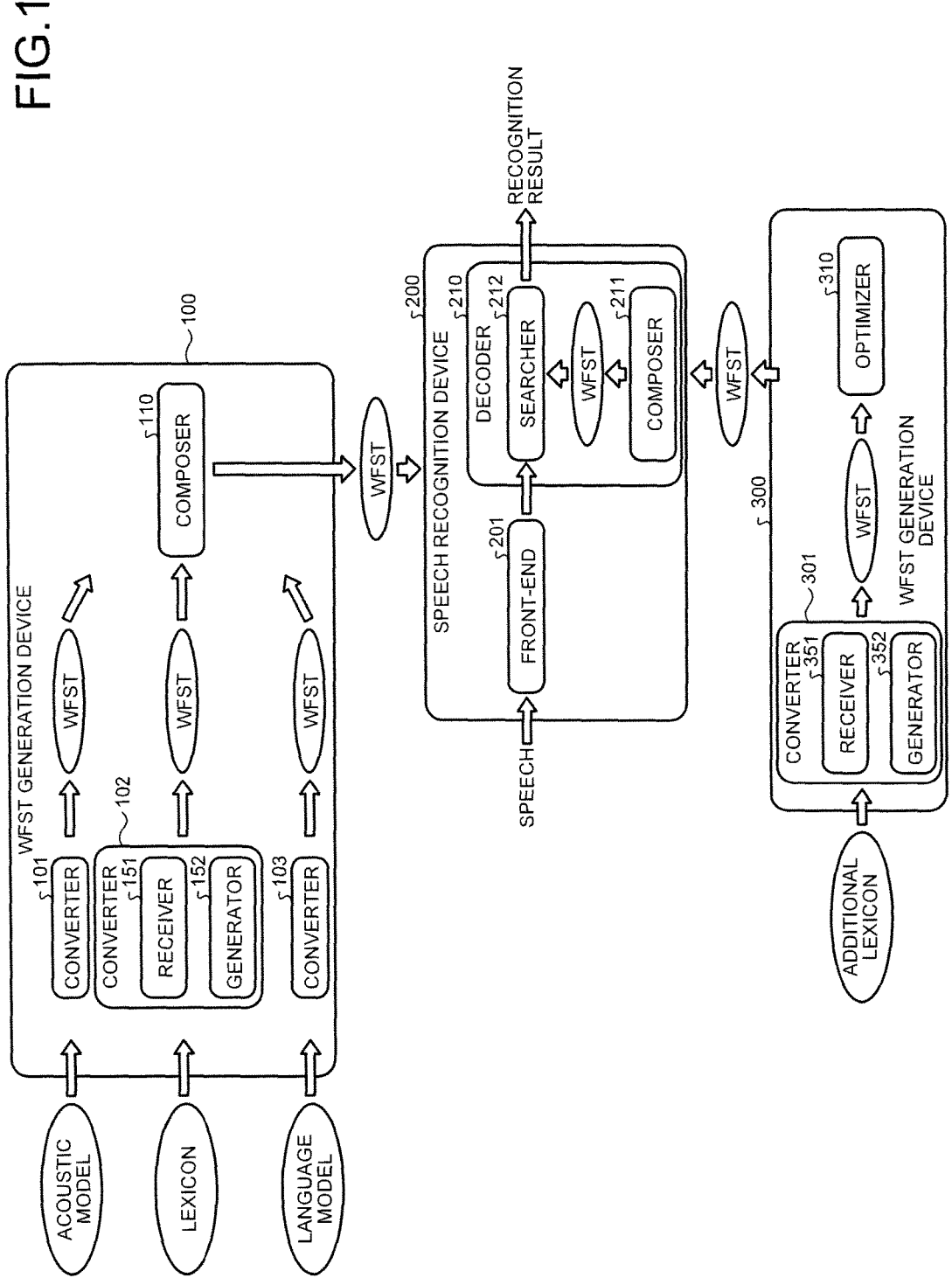
FIG. 1 is a block diagram of a recognition system according to an embodiment.

According to an embodiment, a generation device includes a receiver and a generator. The receiver is configured to receive a first model that converts subwords serving as elements of words into the words. The generator is configured to produce, on the basis of the first model, a first finite state transducer that includes a first path having transitions converting one or more subwords into one or more words and a second path, whose first state is the first state of the first path, having cyclic paths to which the subwords are assigned and a transition to which a class classifying a word is assigned.

The following describes an embodiment of a generation device in detail with reference to the accompanying drawings. In the following description, a generation device is exemplarily described that produces a weighted finite state transducer (WFST) used by a speech recognition device, which is an example of a recognition device (pattern recognition device). The method in the embodiment is applicable to any device that produces the WFST used by a recognition device using the WFST.

A technique is known in which an additional word is added to the WFST that converts subwords into words, the WFST being described as L, for allowing a recognition device to recognize the additional word. The change of L by such a technique requires composition with another WFST and optimization on the composition result again. The change is, thus, inefficient from a viewpoint of a computational complexity.

To avoid such a problem, a technique is known that produces L capable of outputting subwords in the same manner as words and embeds a path relating to the additional word in G, which is a WFST that represents a language model. The technique makes the change of L unnecessary. Furthermore, a pattern recognition device that performs the composition of L (or a WFST obtained by composing L with another WFST) with G during pattern recognition makes calculation for the composition processing unnecessary before starting the operation of the pattern recognition device.

Although such a technique is employed, it is difficult to share the WFST because G is changed. In addition, it is difficult to use the WFST by recording the WFST in a non-rewritable storage medium, for example, because the WFST may be changed.

The path is a sequence of transitions $e_1, \ldots, e_n$, which satisfies the following condition, where n is an integer equal to or larger than one.

Condition: the next state of $e_i$ is equal to the previous state of $e_{i+1}$ where $i=1, 2, \ldots, n-1$.

In the embodiment, a WFST that represents the additional word is produced separately from L and G, and L is produced in which two paths are embedded so as to be capable of being used in combination with the WFST. One of the paths is a cyclic path to which the subword is assigned. The other is a path that includes a class preliminarily embedded in G as an input symbol and an output symbol corresponding to the additional word. This structure does not need to change produced L (or a WFST produced on the basis of L) and makes it possible to obtain the WFST capable of recognizing the additional word.

The subwords are elements of words. In speech recognition, examples of the subwords include phonemes, syllables, and elements connecting phonemes and syllables. In optical character recognition (OCR), examples of the subwords include characters and fragmented characters.

In pattern recognition using the WFST, the use of only L is rare but L is often used being composed with another WFST representing a grammar or a language model.

FIG. 1 is a block diagram illustrating an exemplary structure of a recognition system according to the embodiment. As illustrated in FIG. 1, the recognition system in the embodiment includes a WFST generation device 100, a speech recognition device 200, and a WFST generation device 300.

The WFST generation device 100 produces the WFST necessary to operate the speech recognition device 200. The WFST generation device 300 produces the WFST for recognizing the word that cannot be recognized by the WFST produced by the WFST generation device 100. The speech recognition device 200 converts an input speech into a word string using the WFSTs output by the WFST generation devices 100 and 300. The speech recognition device 200 may be structured such that the speech recognition device 200 is operated by only the WFST produced by the WFST generation device 100.

The WFST generation device 100 includes converters 101, 102, and 103, and a composer 110. The converters 101, 102, and 103 convert an acoustic model, a lexicon, and a language model into respective corresponding WFSTs, respectively. The composer 110 composes the respective WFSTs output by the converters 101, 102, and 103, and optimizes the composed WFST if necessary.

The WFST generation device 300 includes a converter 301 and an optimizer 310. The converter 301 converts an additional lexicon into a WFST. The optimizer 310 optimizes the WFST output by the converter 301.

The acoustic model is used for converting a sound into subwords. The lexicon is a model (first model) used for converting subwords into a word. The language model represents likelihood of a string of words or a constraint. The language model may be a statistical language model or represented by a grammar. The grammar means information that describes a string of recognizable words, for example.

G includes a word to be recognized and a weight corresponding to the word. When G is converted from the statistical language model, a word to be recognized and a probability of word occurrence need to be included in the statistical language model. When G is converted from the grammar, a word to be recognized needs to be included in the grammar.

An additional word is unknown when the statistical language model or the grammar is produced. The number of additional words is also unknown. In the embodiment, a word instead of the additional word is embedded in the language model. In the embodiment, this word is called a class. The class is information used for separating a word from other words, for example. The class may be simply expressed by a number. The class expressed by a user understandable name allows a user to more readily designate the class corresponding to the additional word. Parts of speech can be used for the classes, for example. More detailed names such as a land name, a station name, an apparatus name, a type number, a disease name, a medicine name, a product name, a food product name, a shop name, a food name, a flight name, a plant name, an animal name, a color name, and a fish name may be used for the classes.

The language model can be achieved using a class language model, which is a type of the statistical language model, for example. Besides the above, a word spoken in a similar way to that of the additional word may be treated as a class separately from the word. For example, when the word "sunflower" is included in the statistical language model, a "sunflower class" having the same probability of occurrence as the word may be added to the statistical language model.

The use of G converted from the language model makes it possible to control an appearance location and ease the input of the additional word. When G is converted from the statistical language model, G includes weights based on the probabilities of class occurrence. The probability of additional word occurrence has a value taking into consideration the probability of occurrence of the class corresponding to the additional word. Higher probability of class occurrence facilitates the recognition of the additional word. The high probability of occurrence, however, enhances possibility to cause an utterance different from the additional word to be wrongly recognized as the additional word.

When G is converted from the grammar, the appearance location of the class is specified in the grammar, thereby making it possible to recognize the additional word at only the appearance location of the class. For example, assume that a Japanese sentence " 今日の天気は クラスAです ", which means that "today's weather is class A", is parsed as [ 今日 ] [ の ] [ 天気 ] [ は ] [ クラス A ] [ です ]. This grammatical expression is described word by word by being separated with a bracket [ ]. The character string included in the bracket [ ] is one word. When the additional words corresponding to class A are the three Japanese words of " 晴れ " (fine), " 曇り " (cloudy), and " 雨 " (rainy), recognizable utterances using G are the following three Japanese utterances:
" 今日の天気 は晴れです " (today's weather is fine),
" 今日の天気は 曇りです " (today's weather is cloudy), and
" 今日の天気 は雨です " (today's weather is rainy). When the grammar represents only the string of acceptable words, G can be represented by a finite state transducer (FST) without using the WFST. When the grammar includes weights, which are values each indicating ease of occurrence of the word string acceptable by the grammar, G is represented by the WFST.

The number of WFSTs that the WFST generation device 100 outputs is not limited to one. When the WFST generation device 100 outputs multiple WFSTs, the speech recognition device 200 may be structured so as to dynamically compose the WFSTs.

The additional lexicon includes the additional word. The additional lexicon is input to the WFST generation device 300.

The following describes the structures of the respective devices in FIG. 1 in detail. The structure of the WFST generation device 100 is described below.

Various methods conventionally used are applicable to a method performed by the converter 101 for converting the acoustic model into the WFST and a method performed by the converter 103 for converting the language model into G.

The converter 102 includes a receiver 151 and a generator 152. The receiver 151 receives the lexicon. The generator 152 produces L including the following paths based on the lexicon. A path that includes transitions converting one or more subwords into one or more words (first path). Another path that includes cyclic paths to which the subwords are assigned and transitions to which the classes are assigned (second path).

The first state of the first path is the same as the first state of the second path. The first path can be produced by various methods conventionally used. The generator 152 produces L by adding the second path to the produced first path, for example. Hereinafter, the cyclic path to which the subword is assigned is called a subword loop.

Figure 2:
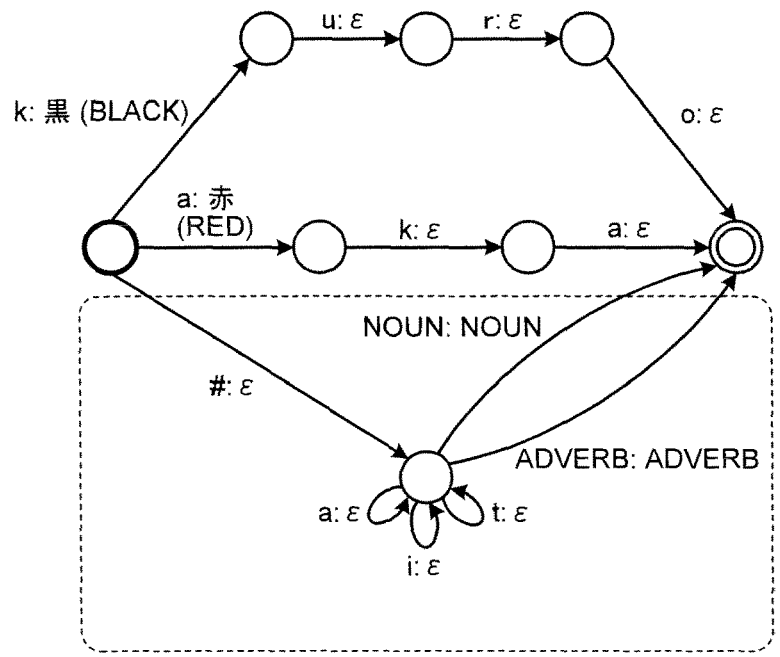
FIG. 2 is a schematic diagram illustrating a produced finite state transducer (WFST)

FIG. 2 is a schematic diagram illustrating an example of produced L. The circles represent the states while the arrows represent the transitions. The double circle represents the final state while the thick circle represents the initial state. In characters written near each transition, a character on the left of the colon represents an input symbol while another character on the right of the colon represents an output symbol. In FIG. 2, weights are omitted. The area without being surrounded with the dotted line is the WFST obtained by a conventional method.

L illustrated in FIG. 2 includes the path corresponding to a Japanese word that is pronounced as "aka" meaning red, and the path corresponding to a Japanese word that is pronounced as "kuro" meaning black. The area surrounded with the dotted line illustrates the paths including the subword loops and the classes. The input symbol "#" is added to the head of the subword loops so as to efficiently perform the composition processing and the optimization processing of the WFST. In the example illustrated in FIG. 2, starting information (input symbol "#") that indicates the start of the subword loops is assigned to the transition entering the subword loops. The classes are assigned to the transitions exiting the subword loops.

The classes may be disposed ahead of the subword loops. In this case, ending information (such as a symbol equivalent to "#") that indicates the end of the subword loops may be assigned to the transitions exiting the subword loops.

A simple subword loop as illustrated in FIG. 2 is an inefficient expression because the subword loop can receive a combination that is impossible to pronounce as a word. To address such a situation, a constraint may be placed on such a simple subword loop. When the subword is a Japanese phoneme, a constraint can be added to the subword loop such that a vowel appears after a voiceless plosive, for example.

Figure 3:
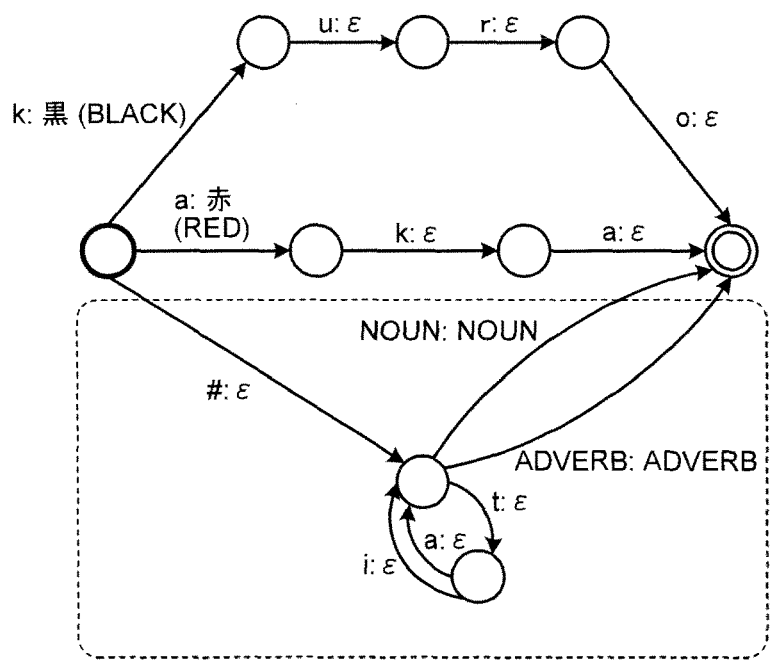
FIG. 3 is a schematic diagram illustrating a produced WFST to which a constraint is added.

FIG. 3 is a schematic diagram illustrating an example of produced L to which the constraint described above is added. FIG. 3 illustrates an example of a subword loop that receives a combination in which "a" or "i", which is a vowel, appears after "t", which is one of the voiceless plosives. The introduction of such a constraint increases the size of L but reduces the number or acceptable paths, thereby reducing the size of the WFST output from the composer 110.

Other constraint conditions may be placed on the subword loop. For example, the subword loop may be structured such that the subword loop receives only a word string included in part or all of a corpus used for producing the language model or a combination of subword strings having a length N appearing in a subword string obtained from part or all of the words included in the lexicon. N is an integer equal to or larger than one.

To perform continuous speech recognition or speech recognition using any grammar, L should receive word strings. L needs to be transformed before the composition with G so as to receive word strings by adding a transition or collecting the final state and the initial state to one state. The transition heads from the final state to the initial state of L and is provided with the input symbol and the output symbol both of which are ε, and has zero-valued weights. Here, ε represents an empty string. Without transforming L after being produced, the generator 152 may be configured to produce L that can originally receive word strings. When isolated word recognition is performed, no transformation is required. In this case, G is also not required.

The composer 110 converts (performs composition or composition and optimization) the WFSTs output by the converters 101, 102, and 103 to produce a WFST (hereinafter, described as HCLG). The composer 110 performs conversion expressed by Equation (1), for example.

$$HCLG = \pi(\text{opt}(H \circ \text{opt}(C \circ \text{opt}(\text{proj}(\det(L) \circ G))))) \qquad (1)$$

In Equation (1), det represents a determinization operation and opt represents an optimization operation. The optimization operation includes the determinization operation and a minimization operation, for example. The symbol "∘" represents a composition operation. For example, "WFST-A1 ∘ WFST-A2" represents the operation to compose the WFST-A1 with the WFST-A2. In Equation (1), π converts auxiliary symbols, which are described later, into ε. The det, opt, "∘", and π operations can be achieved by known methods.

In Equation (1), proj represents processing that copies the input symbol assigned to a transition to the output symbol of the transition. The composer 110 in the embodiment performs the "proj" processing on the transition to which the subword assigned to the subword loop is assigned as the input symbol. In the embodiment, the transition subjected to the "proj" operation is limited to only a part of the transitions as described above.

H is a WFST that represents a hidden Markov model (HMM). C is a WFST that converts context-dependent phonemes into context-independent phonemes. L is the WFST that converts phonemes into a word, as described above. G is the WFST that represents the language model, as described above. H and C can be produced from the acoustic model. For example, the converter 101 can be configured to produce H and C from the acoustic model. H and C include the transition having the input symbol and the output symbol to both of which the class is assigned, and the transition having the input symbol and the output symbol to both of which at least one of the starting information indicating the start of the cyclic paths and the ending information indicating the end of the cyclic paths is assigned. This is for the purpose of keeping the subword loops in the WFST after the composition of C and opt(proj (det(L)∘G)), and the same as the handling of the auxiliary symbols, which are described later. H also includes those transitions because of the same reason as C. Let a set including, as elements, at least one of the starting information indicating the start of the cyclic paths and the ending information indicating the end of the cyclic paths, and the classes be α, then a set composed of the input symbols of L includes α, as illustrated in FIG. 2. In X∘Y, which is the composition of any WFST X with any WFST Y, the paths from the initial state to the final state included in X∘Y are obtained from only the paths of X and Y satisfying that an output symbol string of the paths from the initial state to the final state of X is equal to an input symbol string of paths from the initial state to the final state of Y. The transition that corresponds to the transition of Y and to which a symbol not included in the output symbol of the transition of X is assigned never appear in X∘Y. It is, thus, necessary for keeping the subword loops in HCLG that H and C need to include the transitions having the input symbols and the output symbols to both of which respective elements of α are assigned. When these transitions are expressed as self transitions in the respective states of C and H, the subword loops are left in C ∘opt(proj(det(L)∘G))) and H∘opt(C∘opt (proj(det(L)∘G))). These transitions can be configured to achieve the same effect without self transitions. The details thereof are, however, omitted because the transitions are configured so as to achieve the same effect as the self transitions. When no weights are required, each of H, C, L, and G can be represented as the FST.

In the example using Equation (1), all of H, C, L, and G are composed. Only a part of HCLG may be composed and the balance may be composed by the speech recognition device 200. The operation of det(L) may be simply replaced with L. Any or all of the "opt" operations may be replaced with the "det" operations.

When the subword is not a phoneme, C is not the WFST that converts context-dependent phonemes into context-independent phonemes, but is a WFST that converts context-dependent phonemes into context-independent subwords. In this case, L is also the WFST that converts subwords into words.

As described above, the transition to be subjected to the "proj" processing is the transition to which the subword assigned to the subword loop is assigned as the input symbol.

When subwords used for expressing a pronunciation of a regular word, which is not an additional word, i.e., a word included in the lexicon input to the WFST generation device 100, is partially used as the subword assigned to the subword loop, the subword assigned to the subword loop and the subword assigned to the regular word cannot be differentiated from each other. In this case, a mark is added to the subword assigned to the subword loop for differentiating the subword assigned to the subword loop from the subword assigned to a regular word. After copying from the input symbol to the output symbol, the marked subword is returned to the original subword by removing the mark. For example, when the subwords are expressed in a character string and "$" is not included in the character string, "$" is included in the subword assigned to the subword loop as the mark.

The mark is not limited to the example described above. Any information is applicable that can differentiate the subword assigned to the regular word from the subword assigned to the subword loop. For example, when the subword is expressed by a number, the subword may be differentiated by setting a value obtained by adding a certain value to the number of the subword to the number of the subword assigned to the subword loop. The certain value is set such that the resulting value after the addition of the certain value is not equal to the number expressing the subword before the addition. For example, the certain value is a value larger than a maximum of the number expressing the subword.

The class and "#" assigned to the input symbol of the transition in L are not the subwords. Therefore, the path in which the class and "#" appear is lost when L is composed with C simply obtained by a known method. To avoid such a lost case, the class and "#" assigned to the input symbol of the transition in L are treated as symbols called auxiliary symbols. Specifically, as described above, the transition having the input and the output symbols, to both of which the class or "#" is assigned, is included in C. The auxiliary symbols are used by a known method that converts L (or a WFST obtained by composing L with another WFST) converted from the lexicon including words having the same pronunciation into a determinable WFST. The composer 110 employs such a known method and treats the class and "#" as one of the auxiliary symbols used by the method. Because the class and "#" are treated as the auxiliary symbols, the class and "#" do not remain in the input symbols of HCLG. The class and "#" are removed by the processing π described above.

The following describes the WFST generation device 300. The additional lexicon input to the WFST generation device 300 includes a word, and a subword string and the class that correspond to the word.

The converter 301 of the WFST generation device 300 includes a receiver 351 and a generator 352. The receiver 351 receives the additional lexicon. The generator 352 converts the additional lexicon to produce a WFST (hereinafter described as D) that includes paths having the input symbols to which the subwords and the class are assigned, and the output symbol to which the word is assigned.

D differs from typical L in that the class is added to the end of the subword string of the word and a regular word output from the WFST produced by the WFST generation device 100 is allowed to pass through D without being converted.

Figure 4:
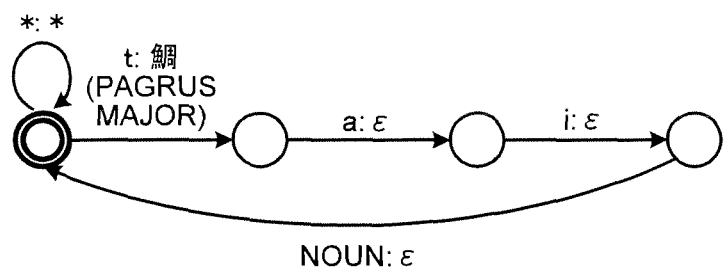
FIG. 4 is a schematic diagram illustrating an example of the produced WFST.

FIG. 4 is a schematic diagram illustrating an example of produced D. The bold double circle represents the initial state and the final state. A new word included in D of FIG. 4 is a Japanese word that is pronounced as "tai" and means "pagrus major". This word is assigned to the output symbol. The pronunciations corresponding to the word ("鯛") are "t", "a", and "i". The class corresponding to the word ("鯛") is "noun". They are assigned to the input symbols.

A self transition at the initial state having the input and the output symbols to both of which "*" is assigned, means that an input regular word is output without being converted. In order to express the self transition without using "*" each word included in the lexicon (the first model) is assigned to both of the input and the output symbols of a self transition. For example, in a case where the lexicon (the first model) includes only a Japanese word meaning "black" and another Japanese word meaning "red", as illustrated in FIG. 2, the self transition having the input and the output symbols to both of which "red" is assigned and the self transition having the input and the output symbols to both of which "black" is assigned, are added to the initial state instead of the self transition illustrated in FIG. 4, which self transition has the input and the output symbols to both of which "*" is assigned. As a result, when the Japanese word meaning "red" is input to D, the word is output without any change, for example. When "tai noun" is input, the Japanese word meaning "pagrus major" is output.

The speech recognition device 200 may perform processing on the basis that the self transition is provided without clearly expressing the self transition with "*". In the example illustrated in FIG. 4, the class is added to the end of the subword string. As a result, D can be composed with L in which the classes are added to the end of the subword loops as illustrated in FIG. 2, for example. When L that includes the classes ahead of the subword loops is to be composed, the generator 352 produces D in which the classes are added to the head of the subword strings.

The optimizer 310 optimizes D. Examples of the optimization operation used by the optimizer 310 include the operation det(D) and the operation opt(D). The generator 352 may perform processing equivalent to the optimization operation simultaneously when performing conversion. The optimizer 310 may be omitted, because the optimizer 310 reduces the number of states and transitions, but does not change a receiving input symbol string and an output symbol string output corresponding to the receiving input symbol string.

The following describes the speech recognition device 200. The speech recognition device 200 includes a front-end 201 and a decoder 210.

The front-end 201 performs processing to detect a speech segment from an input speech and processing to extract a feature of the input speech, for example. The decoder 210 includes a composer 211 and a searcher 212.

The composer 211 composes a WFST including at least a part that the searcher 212 requires using the WFST output by the WFST generation device 100 and the WFST output by the WFST generation device 300, and allows the searcher 212 to refer to the composed WFST. The composer 211 composes a WFST by HCLG∘D, for example. The WFST generation device 100 outputs multiple WFSTs in some cases. In this case, the composer 211 composes the output WFSTs.

The decoder 210 performs search processing by the searcher 212 while the composer 211 dynamically performs HCLG∘D in recognition processing. The composition operation dynamically performed is called on-the-fly composition and can be achieved by a known technique. The processing by the composer 211 may be performed prior to the input of a speech and the WFST after the composition may be used in searching, which requires a larger computational complexity prior to the input of a speech than the on-the-fly composition.

The searcher 212 searches the WFST composed by the composer 211 and recognizes a word or a word string corresponding to the input from the front-end 201. For example, the searcher 212 outputs a word string probably closest to the input speech on the paths as the recognition result using the feature and the acoustic model, taking into consideration an acoustic score indicating coincidence of a sound with respect to each path in the WFST and the weight of each path. The searcher 212 can be operated without D. In this case, the searcher 212 does not search the path from which a phoneme or a class is output, for example.

Figure 5:
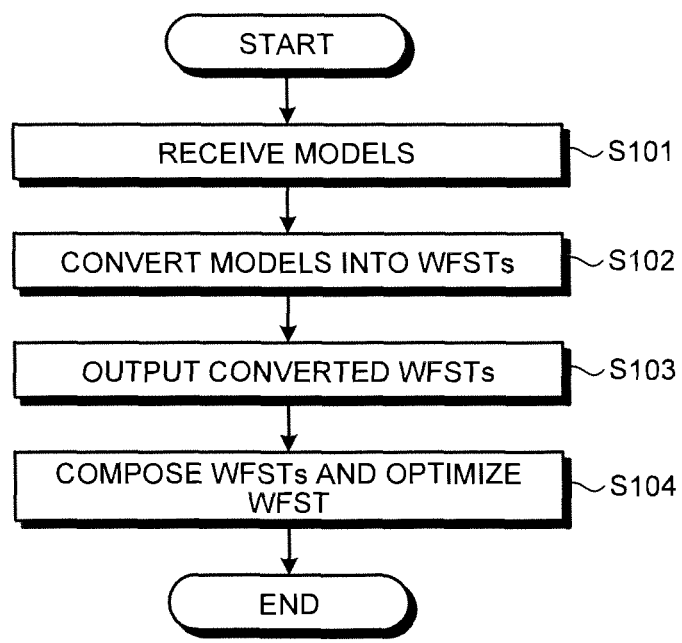
FIG. 5 is a flowchart of generation processing in the embodiment.

The following describes the generation processing performed by the WFST generation device 100 thus structured according to the embodiment with reference to FIG. 5. FIG. 5 is a flowchart illustrating an example of the generation processing in the embodiment.

The respective converters (converters 101, 102, and 103) receive input of the respective corresponding models to be subjected to the corresponding conversion processing (step S101). Each of the converters converts the received model into the WFST (step S102). Each converter outputs the converted WFST to the composer 110 (step S103).

For example, the converter 101 receives the acoustic model, converts the acoustic model into at least one of H and C, and outputs the result. The converter 102 receives the lexicon, converts the lexicon into L, and outputs L. The converter 103 receives the language model, converts the language model into G, and outputs G.

The composer 110 composes the WFSTs output from the respective converters into a WFST and optimizes the composed WFST if necessary (step S104). The composer 110 composes H, C, L, and G into HCLG in accordance with Equation (1), for example.

HCLG thus produced is composed with D produced by the WFST generation device 300, and the composed WFST is used in recognition, which is described later. Any additional word is represented by D. Thus, HCLG does not need to be changed. Consequently, HCLG can be shared.

The WFST generation processing performed by the WFST generation device 300 can also be achieved in the same manner as FIG. 5. For example, the converter 301 performs the same processing as from step S101 to step S103. For another example, the optimizer 310 performs the optimization of the WFST if necessary instead of performing the composition and the optimization at step S104.

Figure 6:
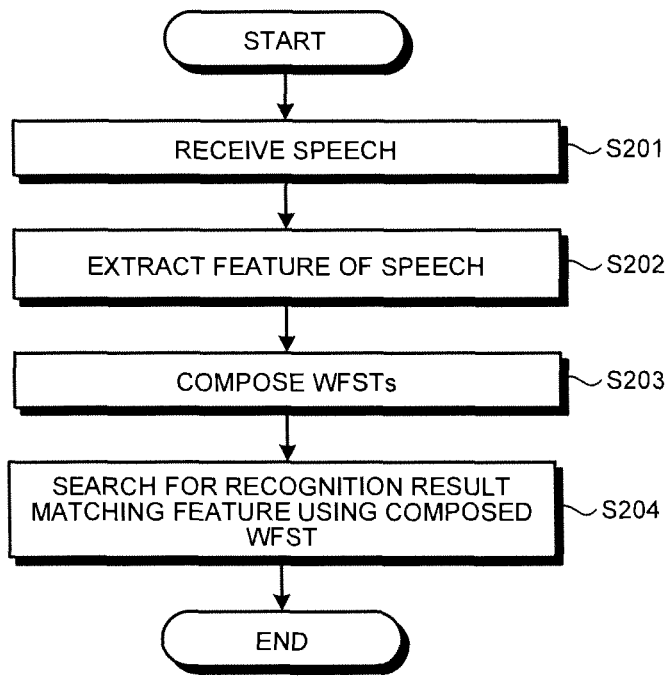
FIG. 6 is a flowchart of recognition processing in the embodiment.

The following describes the recognition processing performed by the speech recognition device 200 thus structured according to the embodiment with reference to FIG. 6. FIG. 6 is a flowchart illustrating an example of the recognition processing in the embodiment.

The front-end 201 receives input of a speech serving as a recognition target (step S201). The front-end 201 analyzes the speech and extracts a feature of the speech (step S202).

The composer 211 composes the WFST (e.g., HCLG) input from the WFST generation device 100 with the WFST (e.g., D) input from the WFST generation device 300 (step S203). The composer 211 does not need to compose all of the input WFSTs. The composer 211 may dynamically compose only a part required by the searcher 212 in the input WFSTs, for example.

The searcher 212 searches for the recognition result (word string) matching the extracted feature using the WFST composed by the composer 211, and outputs the result (step S204).

The following describes examples of the composition processing performed by the composer 211. For easy understanding, LG calculated by Equation (2) is used instead of HCLG.

$$LG = \pi(\text{opt}(\text{proj}(L \circ G))) \quad (2)$$

Equation (2) differs from Equation (1) in that H and C are not included in Equation (2). HCLG and LG have the same output symbols. Thus, LG and D can also be composed in the same manner as the composition of HCLG with D.

Figure 7:
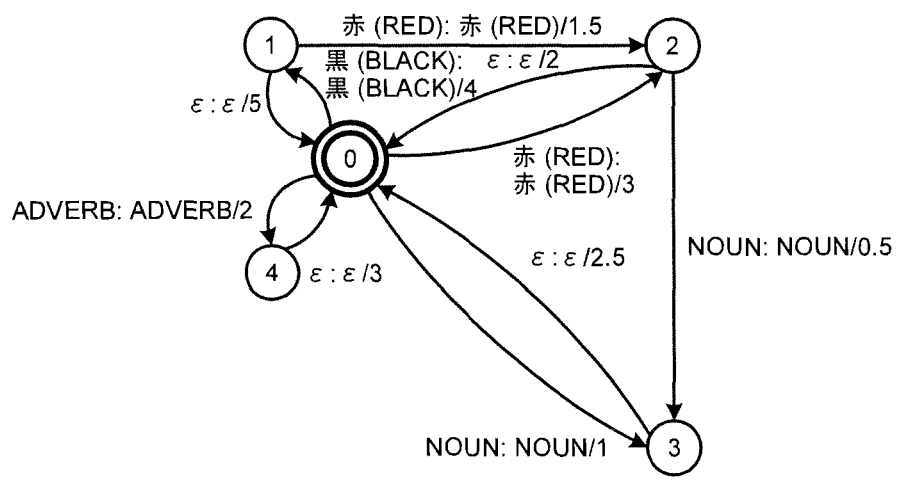
FIG. 7 is a schematic diagram illustrating an example of the WFST used for an explanation.

FIG. 7 is a schematic diagram illustrating an example of D used for the following explanation. G illustrated in FIG. 7 is the WFST that can receive Japanese words each meaning "red" and "black", and "noun" and "adverb" out of word classes. In each of characters near the respective transitions, the input symbol is represented on the left side of the colon, the output symbol is represented between the colon and the slash, and the weight is represented on the right side of the slash. The numbers in respective circles are the given numbers for referring to the respective states. For example, when a symbol string of a Japanese word ("赤") meaning red and "noun" juxtaposed to each other (" 赤 noun") is input to the WFST as an input symbol string, the symbol string in which the Japanese word ("赤") meaning red and "noun" juxtaposed to each other ("赤 noun") is output as an output symbol string. In this case, the respective states on the passing paths are 0, 2, 3, 0 or 0, 2, 0, 3, 0 from the initial state one by one. The sum of weights along each path is 6 or 8.5.

As an example of L, a WFST is used that is obtained by setting the initial and the final states the same in the WFST illustrated in FIG. 2.

Figure 8:
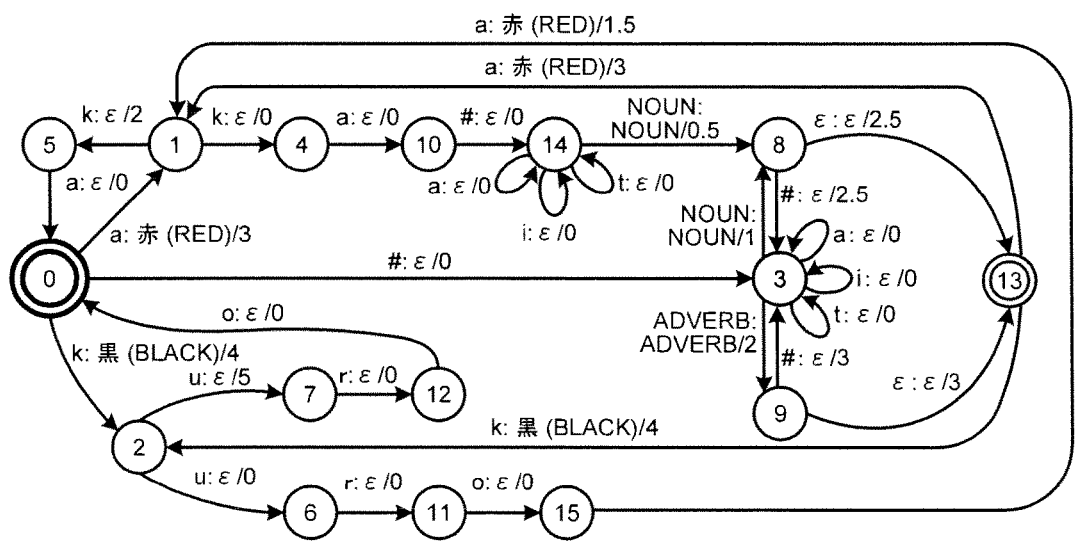
FIG. 8 is a schematic diagram illustrating a WFST obtained by composing the WFSTs in FIGS. 2 and 7.
Figure 9:
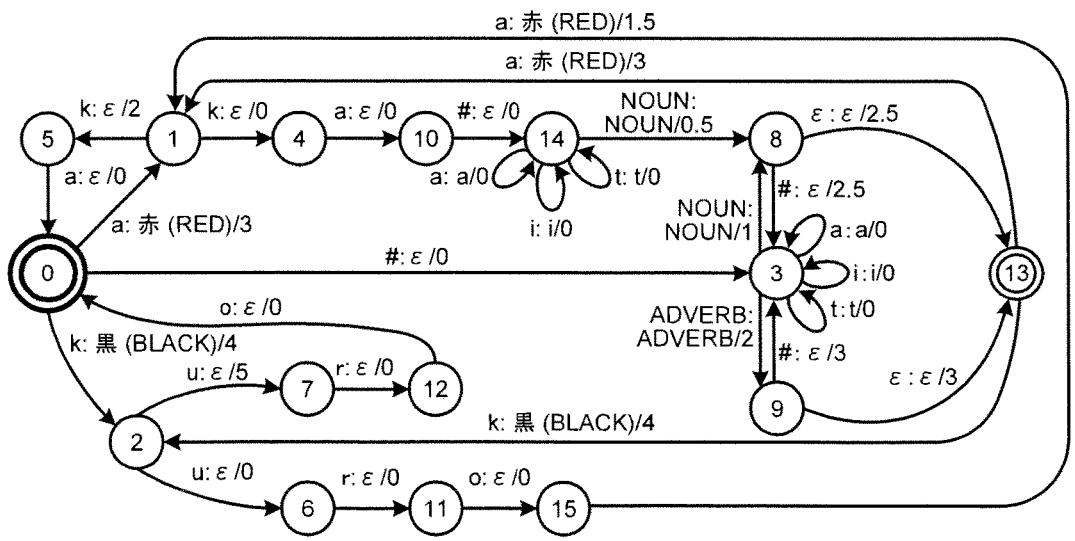
FIG. 9 is a schematic diagram illustrating a WFST obtained by performing "proj" processing on the WFST in FIG. 8.

FIG. 8 is a schematic diagram illustrating an example of a WFST (L∘G) obtained by composing L in FIG. 2 with G in FIG. 7. FIG. 9 is a schematic diagram illustrating an example of a WFST (proj(L∘G)) obtained by performing the processing "proj" on the WFST in FIG. 8. From the comparison FIG. 9 with FIG. 8, it can be seen that the input symbols in the subword loops are copied to the output symbols.

Figure 10:
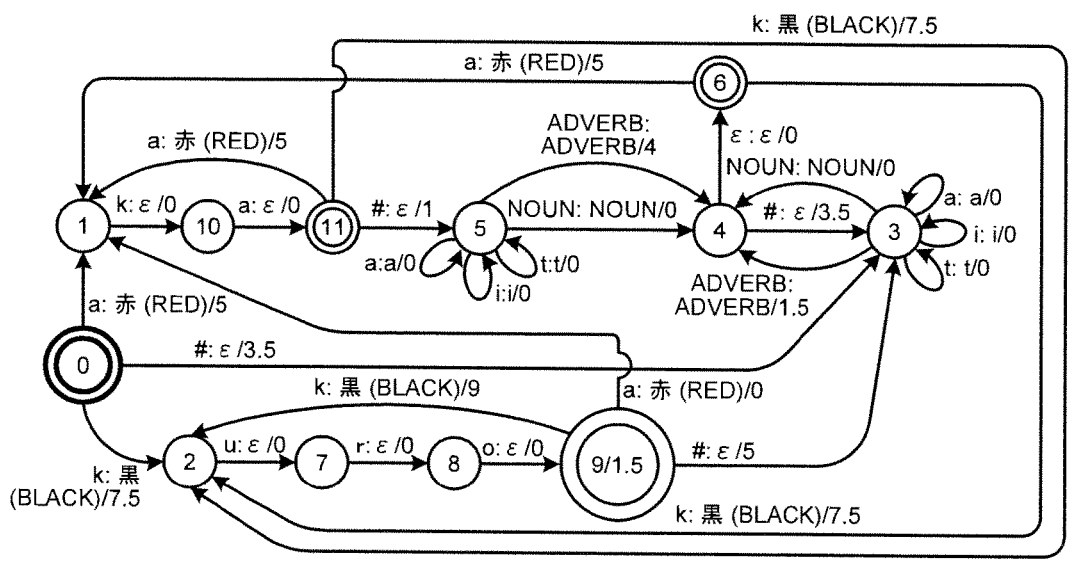
FIG. 10 is a schematic diagram illustrating a WFST obtained by optimizing the WFST in FIG. 9.
Figure 11:
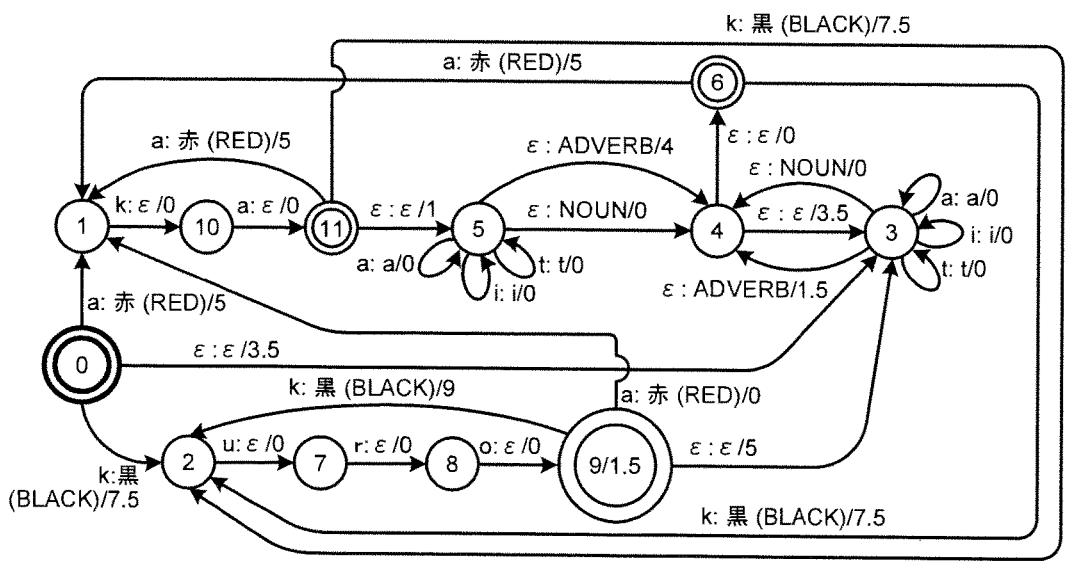
FIG. 11 is a schematic diagram illustrating a WFST obtained by performing $\pi$ processing on the WFST in FIG. 10.

FIG. 10 is a schematic diagram illustrating an example of a WFST (opt(proj(L∘G)) obtained by optimizing the WFST in FIG. 9. FIG. 11 is a schematic diagram illustrating an example of a WFST (π(opt(proj(L∘G))) obtained by performing the processing π on the WFST in FIG. 10. In the WFST illustrated in FIG. 11, each of the auxiliary symbols, which are "#", noun, and adverb in this example, in the input symbols is converted into ε. The WFST illustrated in FIG. 11 is produced by the WFST generation device 100.

Figure 12:
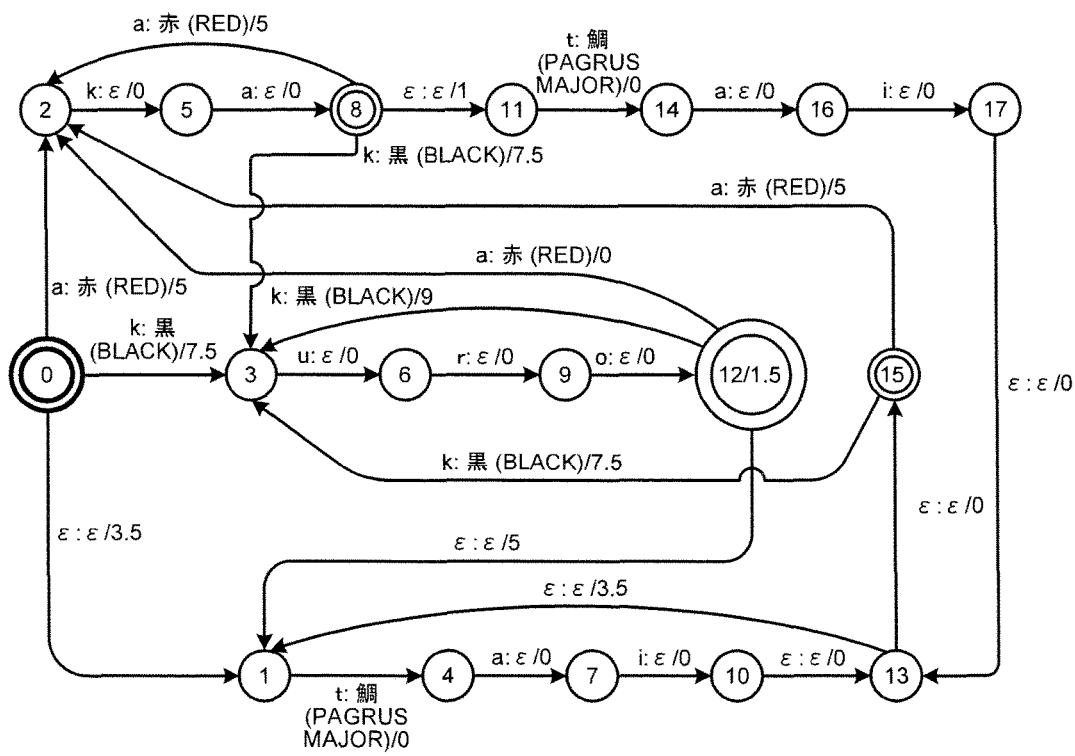
FIG. 12 is a schematic diagram illustrating a WFST obtained by composing the WFSTs in FIGS. 11 and 4.

FIG. 12 is a schematic diagram illustrating an example of a WFST (π(opt(proj(L∘G)))∘D) obtained by composing the WFST in FIG. 11 with D produced by the WFST generation device 300. D is the WFST illustrated in FIG. 4. It can be seen that the additional word ("鯛") pronounced as "tai" is included in each output symbol in the transitions from state 1 to state 4 and from state 11 to state 14. The additional word ("鯛"), thus, can be recognized. The searcher 212 performs search using the WFST thus composed by the composer 211.

The embodiment thus does not need to change the WFST L or G produced from the lexicon or the language model when a word is added, and can produce the WFST such that the WFST produced from the WFST L and/or G also does not need to be changed. When a word is added, the WFST produced by the WFST generation device 100 does not need to be changed. As a result, the WFST produced by the WFST generation device 100 can be shared among the speech recognition devices.

The method described above can be used in various fields that use the WFST besides the speech recognition. For example, the method can be used in devices that recognize sequential data by recognition such as OCR, handwritten character recognition, and gesture recognition.

Figure 13:
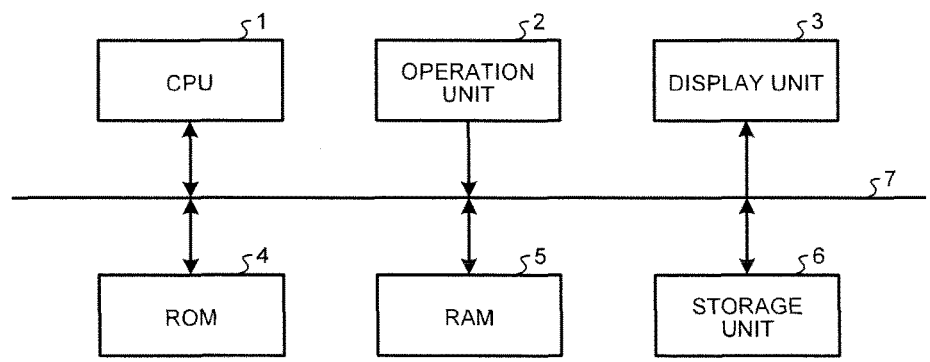
FIG. 13 is a hardware structural diagram of each device according to the embodiment.

The following describes an exemplary hardware structure applicable to the respective devices (the WFST generation device 100, the speech recognition device 200, and the WFST generation device 300) in the embodiment with reference to FIG. 13. FIG. 13 is an explanatory view illustrating an exemplary hardware structure of each device according to the embodiment.

As illustrated in FIG. 13, each of the devices in the embodiment includes a central processing unit (CPU) 1, an operation unit 2, a display 3, a read only memory (ROM) 4, a random access memory (RAM) 5, a storage 6, and a bus 7. The respective components are coupled through the bus 7.

The CPU 1 performs various types of processing by cooperating with various control programs preliminarily stored in the ROM 4 or the storage 6 using a certain area in the RAM 5 as a working area, and totally controls the operation of the respective units included in the respective devices in the embodiment. The CPU 1 achieves the functions of the respective functional units by cooperating with a certain program preliminarily stored in the ROM 4 or the storage 6.

The respective functional units of the respective devices may be achieved by a processing unit such as a CPU executing a program, i.e., by software, or by hardware such as an integrated circuit (IC), or by software and hardware together. The program may be provided as a computer program product such as a computer-readable medium storing the program.

The operation unit 2, which is an input device such as a mouse or a keyboard, receives information input by the user's operation as an instruction signal, and outputs the instruction signal to the CPU 1.

The display 3, which includes a display such as a liquid crystal display (LCD), displays various types of information in accordance with a display signal from the CPU 1.

The ROM 4 stores therein the programs to control the respective devices and various types of setting information for the respective devices in the embodiment in a non-rewritable manner.

The RAM 5, which is a volatile storage medium such as a synchronous dynamic random access memory (SDRAM), functions as a working area of the CPU 1. Specifically, the RAM 5 serves as a buffer that temporarily stores therein various variables or parameter values used in generation of the WFST or recognition using the WFST.

The storage 6, which includes a semiconductor storage medium such as a flash memory and a magnetically or optically recordable storage medium, stores therein the programs to control the respective devices and various types of setting information for the respective devices in the embodiment in a rewritable manner. The storage 6 stores therein preliminarily various types of information about the WFST and the results of operations performed on the WFST.

A part or all of the respective devices in the embodiment may be operated under different hardware or the same hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition system comprising:
processing circuitry coupled to a memory, the processing circuitry being configured to:
receive a first model that converts subwords serving as elements of words into the words, the subwords being one or more phonemes or one or more syllables;
produce, on the basis of the first model, a first finite state transducer that includes a first path having transitions converting one or more first subwords into one or more first words and a second path having cyclic paths to which one or more second subwords are assigned and a transition to which a class is assigned, a first state of the second path being the same as a first state of the first path;
produce a third finite state transducer by composing the first finite state transducer with a second finite state transducer produced on the basis of a language model that includes the class; and
produce a fifth finite state transducer by composing the third finite state transducer with a fourth finite state transducer, the fourth finite state transducer being produced on the basis of a second model and including a third path, the second model including an additional word, one or more subwords and the class that corresponds to the additional word; and a searcher configured to recognize a second word corresponding to an input speech by using the fifth finite state transducer, wherein the searcher outputs the second word other than the additional word, without performing conversion by the fourth finite state transducer, and outputs the additional word that is an output symbol on a fourth path of the fifth finite state transducer, the fourth path is generated by composing a fifth path of the third finite state transducer with the third path, one of the output symbols on the third path is the additional word, an input symbol string on the third path includes one or more third subwords and the class, and corresponds to an output symbol string of the fifth path, and the class which appears in the input symbol string on the third path and appears in the output symbol string of the fifth path controls an appearance location of the additional word.

2. The recognition system according to claim 1, wherein the class is assigned to either a transition that enters the cyclic paths or a transition that exits the cyclic paths.

3. The recognition system according to claim 1, wherein the class is assigned to a transition that exits the cyclic paths, and starting information that indicates a start of the cyclic paths is assigned to a transition that enters the cyclic paths.

4. The recognition system according to claim 1, wherein the class is assigned to a transition that enters the cyclic paths, and ending information that indicates an end of the cyclic paths is assigned to a transition that exits the cyclic paths.

5. The recognition system according to claim 1, wherein the class is part of speech.

6. The recognition system according to claim 1, wherein the sixth finite state transducer is at least one of a finite state transducer that converts context-dependent phonemes to context-independent phonemes and a finite state transducer that represents a hidden Markov model.

7. The recognition system according to claim 1, wherein the processing circuitry assigns an input symbol of a transition to an output symbol of the transition, to which a subword having been assigned as an input symbol to a transition on the cyclic paths is assigned, in the third finite state transducer.

8. The recognition system according to claim 1, wherein the second finite state transducer includes a transition provided with an input symbol and an output symbol to both of which the class is assigned.

9. The recognition system according to claim 1, wherein the processing circuitry produces the fifth finite state transducer while the searcher performs the search processing.

10. A recognition system device comprising:

processing circuitry coupled to a memory, the processing circuitry being configured to:

receive a first model that converts subwords serving as elements of words into the words, the subwords being one or more phonemes or one or more syllables;

produce, on the basis of the first model, a first finite state transducer that includes a first path having transitions converting one or more first subwords into one or more first words and a second path having cyclic paths to which one or more second subwords are assigned and a transition to which a class is assigned, a first state of the second path being the same as a first state of the first path;

produce a third finite state transducer by composing the first finite state transducer with a second finite state transducer produced on the basis of a language model that includes the class; and produce a fifth finite state transducer by composing a seventh finite state transducer with a fourth finite state transducer, the fourth finite state transducer being produced on the basis of a second model and including a third path, the second model including an additional word, one or more subwords and the class that correspond to the additional word, the seventh finite state transducer being produced by composing the third finite state transducer with a sixth finite state transducer that includes a transition provided with an input symbol and an output symbol to both of which the class is assigned and a transition provided with the input and output symbols to both of which at least one of starting information indicating a start of the cyclic paths and ending information indicating an end of the cyclic paths is assigned; and a searcher configured to recognize a second word corresponding to an input speech by using the fifth finite state transducer, wherein the searcher outputs the second word other than the additional word, without performing conversion by the fourth finite state transducer, and outputs the additional word that is an output symbol on a fourth path of the fifth finite state transducer, the fourth path is generated by composing a fifth path of the seventh finite state transducer with the third path, one of the output symbols on the third path is the additional word, an input symbol string on the third path includes one or more third subwords and the class, and corresponds to an output symbol string of the fifth path, and the class which appears in the input symbol string on the third path and appears in the output symbol string of the fifth path controls an appearance location of the additional word.

11. The recognition system according to claim 10, wherein the processing circuitry produces the fifth finite state transducer while the searcher performs the search processing.

12. The recognition system according to claim 10, wherein the processing circuitry removes the class, and the starting information or the ending information from input symbols of transitions included in the seventh finite state transducer.

13. A recognition method comprising:

receiving a first model that converts subwords serving as elements of words into the words, the subwords being one or more phonemes or one or more syllables;

producing, on the basis of the first model, a first finite state transducer that includes a first path having transitions converting one or more first subwords into one or more first words and a second path having cyclic paths to which one or more second subwords are assigned and a transition to which a class is assigned, a first state of the second path being the same as a first state of the first path;

producing a third finite state transducer by composing the first finite state transducer with a second finite state transducer produced on the basis of a language model that includes the class;

producing a fifth finite state transducer by composing the third finite state transducer with a fourth finite state transducer, the fourth finite state transducer being produced on the basis of a second model and including a third path, the second model including an additional word, one or more subwords and the class that correspond to the additional word; and
recognizing a second word corresponding to an input speech by using the fifth finite state transducer, wherein
the recognizing includes outputting the second word other than the additional word, without performing conversion by the fourth finite state transducer, and outputting the additional word that is an output symbol on a fourth path of the fifth finite state transducer,
the fourth path is generated by composing a fifth path of the third finite state transducer with the third path,
one of the output symbols on the third path is the additional word,
an input symbol string on the third path includes one or more third subwords and the class, and corresponds to an output symbol string of the fifth path, and
the class which appears in the input symbol string on the third path and appears in the output symbol string of the fifth path controls an appearance location of the additional word.

14. A computer program product comprising a non-transitory computer-readable medium containing a program executed by a computer, the program causing the computer to execute:
receiving a first model that converts subwords serving as elements of words into the words, the subwords being one or more phonemes or one or more syllables;
producing, on the basis of the first model, a first finite state transducer that includes a first path having transitions converting one or more first subwords into one or more first words and a second path having cyclic paths to which one or more second subwords are assigned and a transition to which a class is assigned, a first state of the second path being the same as a first state of the first path;
producing a third finite state transducer by composing the first finite state transducer with a second finite state transducer produced on the basis of the language model that includes the class;
producing a fifth finite state transducer by composing the third finite state transducer with a fourth finite state transducer, the fourth finite state transducer being produced on the basis of a second model and including a third path, the second model including an additional word, one or more subwords and the class that correspond to the additional word; and
recognizing a second word corresponding to an input speech by using the fifth finite state transducer, wherein
the recognizing includes outputting the second word other than the additional word, without performing conversion by the fourth finite state transducer, and outputting the additional word that is an output symbol on a fourth path of the fifth finite state transducer,
the fourth path is generated by composing a fifth path of the third finite state transducer with the third path,
one of the output symbols on the third path is the additional word,
an input symbol string on the third path includes one or more third subwords and the class, and corresponds to an output symbol string of the fifth path, and
the class which appears in the input symbol string on the third path and appears in the output symbol string of the fifth path controls an appearance location of the additional word.

15. A recognition method comprising:
receiving a first model that converts subwords serving as elements of words into the words, the subwords being one or more phonemes or one or more syllables;
producing, on the basis of the first model, a first finite state transducer that includes a first path having transitions converting one or more first subwords into one or more first words and a second path having cyclic paths to which one or more second subwords are assigned and a transition to which a class is assigned, a first state of the second path being the same as a first state of the first path;
producing a third finite state transducer by composing the first finite state transducer with a second finite state transducer produced on the basis of a language model that includes the class;
producing a fifth finite state transducer by composing a seventh finite state transducer with a fourth finite state transducer, the fourth finite state transducer being produced on the basis of a second model and including a third path, the second model including an additional word, one or more subwords and the class that correspond to the additional word, the seventh finite state transducer being produced by composing the third finite state transducer with a sixth finite state transducer that includes a transition provided with an input symbol and an output symbol to both of which the class is assigned and a transition provided with the input and the output symbols to both of which at least one of starting information indicating a start of the cyclic paths and ending information indicating an end of the cyclic paths is assigned; and
recognizing a second word corresponding to an input speech by using the fifth finite state transducer, wherein
the recognizing includes outputting the second word other than the additional word, without performing conversion by the fourth finite state transducer, and outputting the additional word that is an output symbol on a fourth path of the fifth finite state transducer,
the fourth path is generated by composing a fifth path of the seventh finite state transducer with the third path,
one of the output symbols on the third path is the additional word,
an input symbol string on the third path includes one or more third subwords and the class, and corresponds to an output symbol string of the fifth path, and
the class which appears in the input symbol string on the third path and appears in the output symbol string of the fifth path controls an appearance location of the additional word.

16. A computer program product comprising a non-transitory computer-readable medium containing a program executed by a computer, the program causing the computer to execute:
receiving a first model that converts subwords serving as elements of words into the words, the subwords being one or more phonemes or one or more syllables;
producing, on the basis of the first model, a first finite state transducer that includes a first path having transitions converting one or more first subwords into one or more first words and a second path having cyclic paths to which one or more second subwords are assigned and a transition to which a class is assigned, a first state of the second path being the same as a first state of the first path;

producing a third finite state transducer by composing the first finite state transducer with a second finite state transducer produced on the basis of a language model that includes the class;

producing a fifth finite state transducer by composing a seventh finite state transducer with a fourth finite state transducer, the fourth finite state transducer being produced on the basis of a second model and including a third path, the second model including an additional word, one or more subwords and the class that correspond to the additional word, the seventh finite state transducer being produced by composing the third finite state transducer with a sixth finite state transducer that includes a transition provided with an input symbol and an output symbol to both of which the class is assigned and a transition provided with the input and the output symbols to both of which at least one of starting information indicating a start of the cyclic paths and ending information indicating an end of the cyclic paths is assigned; and recognizing a second the word corresponding to an input speech by using the fifth finite state transducer, wherein the recognizing includes outputting the second word other than the additional word, without performing conversion by the fourth finite state transducer, and outputting the additional word that is an output symbol on a fourth path of the fifth finite state transducer, the fourth path is generated by composing a fifth path of the seventh finite state transducer with the third path, one of the output symbols on the third path is the additional word, an input symbol string on the third path includes one or more third subwords and the class, and corresponds to an output symbol string of the fifth path, and the class which appears in the input symbol string on the third path and appears in the output symbol string of the fifth path controls an appearance location of the additional word.

* * * * *